(12) United States Patent
Yamaji et al.

(10) Patent No.: US 8,120,580 B2
(45) Date of Patent: Feb. 21, 2012

(54) ELECTRONIC APPARATUS WITH DISPLAY SCREEN

(75) Inventors: Yasufumi Yamaji, Tokyo (JP); Katsuji Miyazawa, Shanghai (CN); Zhongsheng Hong, Shanghai (CN)

(73) Assignee: Sony (China) Limited, Chao Yang District Beijing (CN)

( * ) Notice: Subject to any disclaimer, the term of this patent is extended or adjusted under 35 U.S.C. 154(b) by 763 days.

(21) Appl. No.: 12/104,786

(22) Filed: Apr. 17, 2008

(65) Prior Publication Data

US 2009/0073118 A1    Mar. 19, 2009

(51) Int. Cl.
G06F 3/033  (2006.01)
(52) U.S. Cl. .................. 345/161; 345/156; 715/831
(58) Field of Classification Search .......... 345/173, 345/156–172, 184; 715/810–845, 856–862
See application file for complete search history.

(56) References Cited

U.S. PATENT DOCUMENTS

| | | | |
|---|---|---|---|
| 6,614,419 B1* | 9/2003 | May | 345/156 |
| 6,757,157 B2* | 6/2004 | Lammintaus et al. | 361/679.3 |
| 7,812,824 B2* | 10/2010 | Im et al. | 345/173 |
| 2004/0222965 A1* | 11/2004 | Riccomini et al. | 345/156 |
| 2006/0030375 A1* | 2/2006 | Tanaka | 455/575.1 |
| 2006/0279541 A1* | 12/2006 | Kim et al. | 345/158 |
| 2007/0061757 A1* | 3/2007 | Kobayashi | 715/828 |
| 2007/0164989 A1* | 7/2007 | Rochford et al. | 345/156 |
| 2007/0247446 A1* | 10/2007 | Orsley et al. | 345/184 |
| 2007/0285401 A1* | 12/2007 | Ohki et al. | 345/173 |
| 2008/0218479 A1* | 9/2008 | Toorn | 345/168 |

FOREIGN PATENT DOCUMENTS

| | | |
|---|---|---|
| JP | 4-88545 | 3/1992 |
| JP | 2002-82752 | 3/2002 |
| JP | 2002-157078 | 5/2002 |
| JP | 2004-226786 | 8/2004 |
| JP | 2005-228043 | 8/2005 |
| WO | WO 2006051669 A1 * | 5/2006 |

* cited by examiner

*Primary Examiner* — Amare Mengistu
*Assistant Examiner* — Dmitriy Bolotin
(74) *Attorney, Agent, or Firm* — Oblon, Spivak, McClelland, Maier & Neustadt, L.L.P.

(57) ABSTRACT

The present invention provides an electronic apparatus including a display screen having a first menu display area and a second menu display area, and a direction key provided on a side; first menu items arranged in a right-left direction are displayed in the first menu display area, and second menu items arranged in an up-down direction are displayed in the second menu display area, the direction key and the first menu display area are positioned substantially on a straight line extending in the right-left direction, the first menu items can be selected when a front portion/back portion of the direction key is pressed, the second menu items corresponding to the selected first menu items can be selected when an upper portion/lower portion of the direction key is pressed, and the selected menu items can be confirmed when a center portion of the direction key is pressed.

13 Claims, 10 Drawing Sheets

ELECTRONIC APPARATUS WITH DISPLAY SCREEN

FIELD OF THE INVENTION

The present invention relates to an electronic apparatus with display screen, and more particularly relates to a display device provided with a direction key.

BACKGROUND OF THE INVENTION

In the present electronic age, display products, such as mobile phone, PMP (Portable Media Player), portable video player, PDA (Personal Digital Assistant), digital camera, pickup camera, display device, portable TV, electronic photo album and the like, have been used widely in our daily life. In general, an electronic apparatus with display screen is provided with a direction key having the functions for selecting the played contents, confirming the playing operation and the like.

In the current electronic apparatuses with display screen, the direction key is generally provided on the front surface where the display screen is positioned, this arranging manner, however, has following drawback: the size of the display screen is relatively small because the direction key occupies a relatively large area of the front surface.

In order to increase the size of the display screen, Japanese patent application publication KOKAI No. 2005-228043A disclosed a display device provided with a rotary direction key which is provided at the upper end of the display device and selects the display contents by rotating in forth-back direction about its rotating axle. In addition, Japanese patent application publication KOKAI No. 2002-157078A also disclosed a display device provided with a rotary direction key which is provided at the left end of the display device and selects the display contents by rotating in forth-back direction about its rotating axle.

However, the display devices disclosed in Japanese patent application publication KOKAI No. 2005-228043A and Japanese patent application publication KOKAI No. 2002-157078A have following drawback: the rotary direction key is not applicable to the display devices having more than three functions because the rotary direction key has the selecting function in two directions only (KOKAI No. 2005-228043A has the selecting function in forth-back direction only and KOKAI No. 2002-157078A has the selecting function in up-down direction only); meanwhile, there is no intuitive relationship of correspondence between the position where the above-mentioned rotary direction key is provided and the display area on the display screen, so that the user can not select the displayed menu items intuitively, simply and conveniently.

SUMMARY OF THE INVENTION

In view of the above-mentioned fact, one main object of the present invention is to provide an electronic apparatus provided with a display screen larger in size and a direction key operable in an intuitive manner.

In order to achieve the object, the present invention provides an electronic apparatus with display screen, wherein a direction key is provided on a side of said electronic apparatus, the display screen of said electronic apparatus has a main menu display area and a submenu display area, a plurality of main menu items arranged in right-left direction are displayed in said main menu display area, and a plurality of submenu items arranged in upper-down direction are displayed in said submenu display area, wherein said direction key and said main menu display area are positioned substantially on the same straight line extending in the right-left direction; the main menu items in the main menu display area can be selected when front portion/back portion of the direction key is pressed; the submenu items corresponding to the selected main menu items can be selected in the submenu display area when upper portion/lower portion of the direction key is pressed; and the selected menu items can be confirmed when center portion of the direction key is pressed.

Compared with the prior art, because the direction key of the present invention is provided on the side of the electronic apparatus, the size of the display screen can be increased; and the position where the direction key is provided corresponds substantially to said main menu display area in the horizontal direction, therefore, there is a certain intuitive relationship of correspondence between the direction key and the main menu, and the user can operate it more intuitively and conveniently.

DETAILED DESCRIPTION OF THE PREFERRED EMBODIMENTS

The First Embodiment

Figure 1:
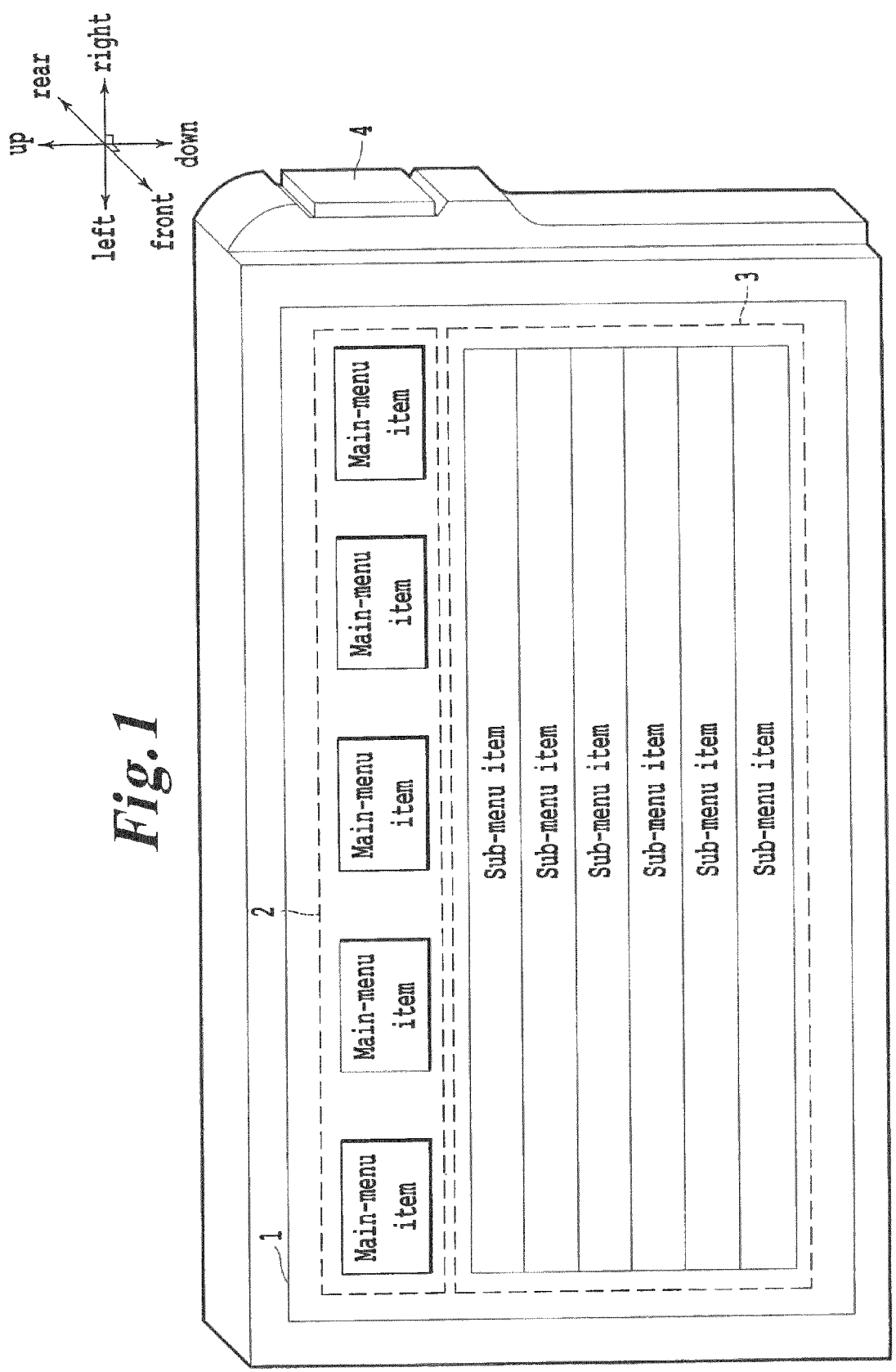
FIG. 1 is a front perspective schematic view of the first embodiment of the present invention.

FIGS. 1~6 show the electronic apparatus with display screen of the first embodiment of the present invention. For convenience in explanation, the right-left direction in FIG. 1 is defined as the horizontal direction, and the up-down direction as the vertical direction. The first embodiment discloses the case that direction key 4 is located right side of the electronic apparatus.

As shown in FIG. 1, the front surface of the electronic apparatus has display screen 1 without any key and button. When the electronic apparatus is in the state of initial selection, the upper portion area of the display screen 1 is an area for displaying the main menu, that is, main menu display area 2 (the area surrounded by the dashed lines in FIG. 1, it should be noted that the dashed lines are for purpose of explanation only and do not exist on the actual screen), and the lower portion area of the display screen 1 is an area for displaying the submenu, that is, submenu display area 3 (the area surrounded by the dashed lines in FIG. 1, it should be noted that the dashed lines are for purpose of explanation only and do not exist on the actual screen).

In the main menu display area 2 are displayed a plurality of main menu items (e.g. songs, movies, games and the like) which are arranged in a row along the right-left direction (i.e. the horizontal direction). In the submenu display area 3 are displayed a plurality of submenu items corresponding to the selected main menu items (e.g. the submenu item corresponding to "movie" as the main menu item, each of the submenu items can include further the title, description, representative pictures and the like of the movie) which are arranged in a column along the up-down direction (i.e. vertical direction). Of course the direction of main menu and sub menu is reversible.

Figure 2:
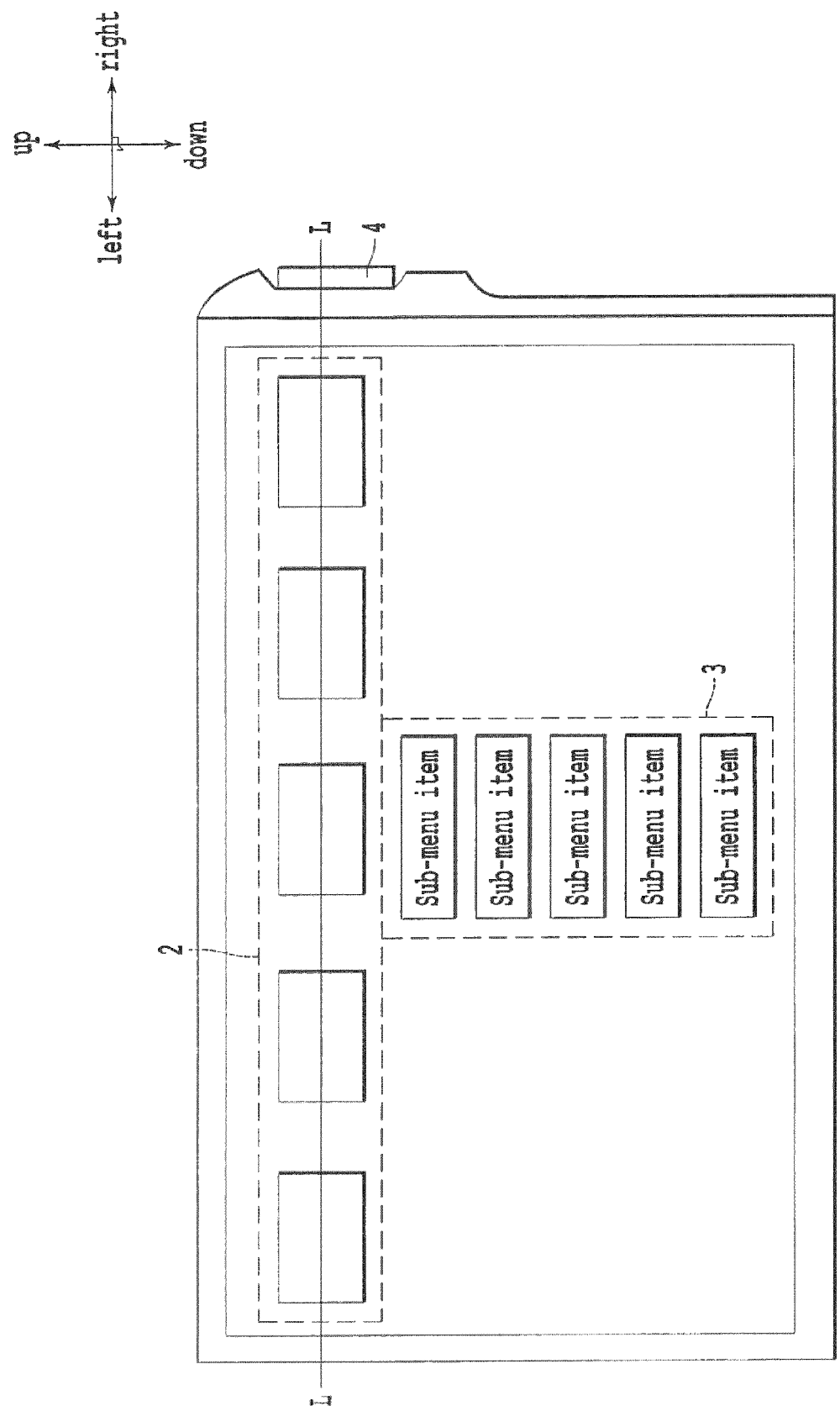
FIG. 2 is a front view of the electronic apparatus in FIG. 1.
Figure 3:
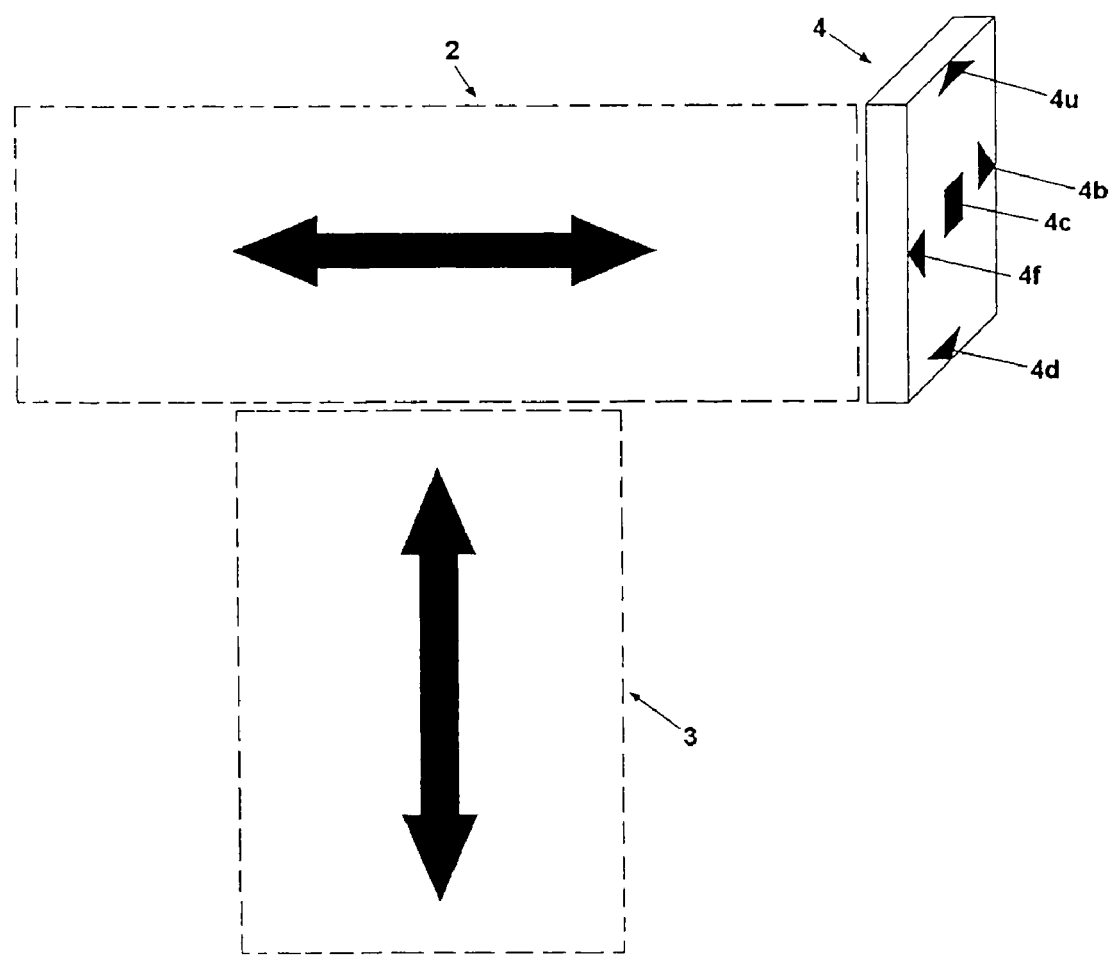
FIG. 3 is a view for explaining the operating principle of the direction key of the electronic apparatus in FIG. 1.

As shown in FIG. 1 and FIG. 2, direction key 4 (the direction key in the present invention has a plurality functions for selecting the main menu items, selecting the submenu items, confirming the selected menu items and the like, therefore, it can be referred to as "multifunctional direction key") is provided in the upper portion of the side of the electronic apparatus, the direction key 4 and the main menu display area 2 are positioned substantially on the same straight line L extending in the right-left direction, that is, the position where the direction key 4 is provided substantially corresponds to the main menu display area 2 in the horizontal direction. The reason why the direction key 4 is provided in the upper portion of the side of the electronic apparatus is that most of users used to use his/her palm, middle finger, ring finger and little finger to hold the lower portion of the electronic apparatus and stretch up thumb or forefinger to operate the direction key 4. Therefore, providing the direction key 4 in the position to operate easily for forefinger facilitates the operation of the electronic apparatus by user. FIG. 3 shows the operating principle of the direction key, that is, the main menu items in the main menu display area 2 can be selected when the front portion 4f/back portion 4b of the direction key 4 is pressed; the submenu items in the submenu display area 3 can be selected when the upper portion 4u/lower portion 4d of the direction key 4 is pressed; and the selected menu items can be confirmed when center portion 4c of the direction key is pressed. It should be noted that if the main menu has too many items to display in the main menu display area 2 simultaneously, the main menu items in main menu display area 2 will be shifted in the right-left direction (that is, be shifted in the direction as indicated by the horizontal arrow in FIG. 3) until the required main menu item is shifted into the main menu display area 2 by pressing front portion 4f/back portion 4b of the direction key 4, as shown in FIG. 3, which facilitates the creation of the intuitive relationship between the direction key 4 and the main menu, and more intuitive and convenient operation of the electronic apparatus by user. Meanwhile, if the submenu has too many items to display in the submenu display area 3 simultaneously, the submenu items in the submenu display area 3 will be shifted in the up-down direction (that is, be shifted in the direction as indicated by the vertical arrow in FIG. 3) by pressing upper portion 4u/lower portion 4d of the direction key 4, as shown in FIG. 3, which conforms to the people's habitual operation and facilitates the more intuitive and convenient operation of the electronic apparatus; and the selected menu items can be confirmed when center portion 4c of the direction key 4 is pressed.

Figure 4:
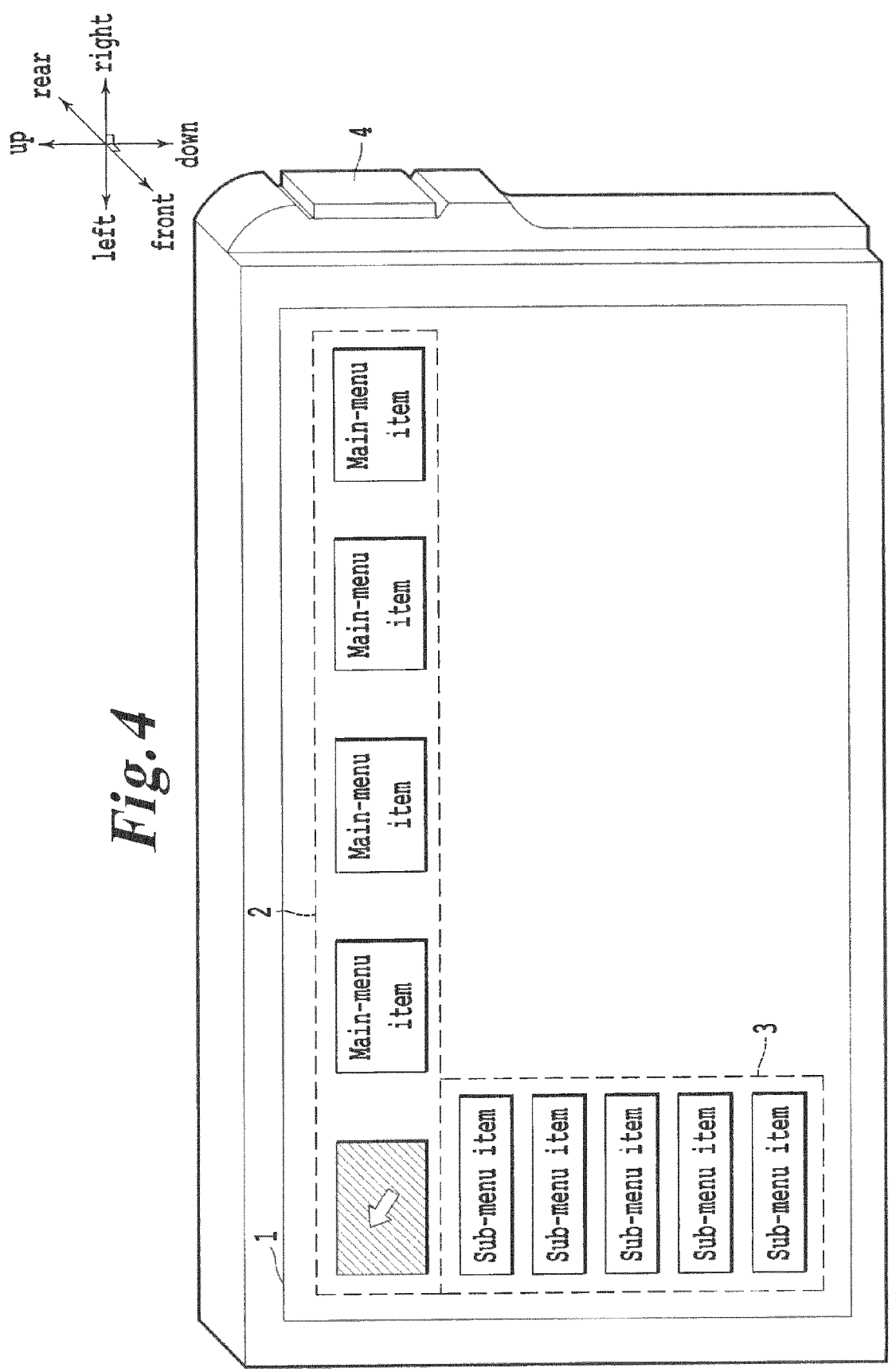
FIG. 4 is a schematic view for explaining another operation of the electronic apparatus in FIG. 1.

FIG. 4 shows a schematic view for explaining another operation of the electronic apparatus of the present embodiment. A user can also select and confirm the menu items by moving a mouse instead of using the direction key; or, of course, by touching the display screen as well.

In addition, a button for confirmation operation can be provided separately from the direction key 4. At that time, since the direction key 4 and main menu display area 2 are positioned substantially on the same straight line, a user can also select the menu item by intuition.

In addition, the display screen 1 can be composed of touch panel display, a user can operate more intuitively. The direction key 4 can provide supplementary means for user's intuitive operation particularly when a user select the menu item.

In addition, since most of users used to use his/her right hand to hold articles, the direction key 4 of the present embodiment is provided in the upper portion of the right side of the electronic apparatus. Of course, the direction key 4 can be provided in the upper portion on the left side of the electronic apparatus for the users who used to use his/her left hand to hold articles.

Figure 10:
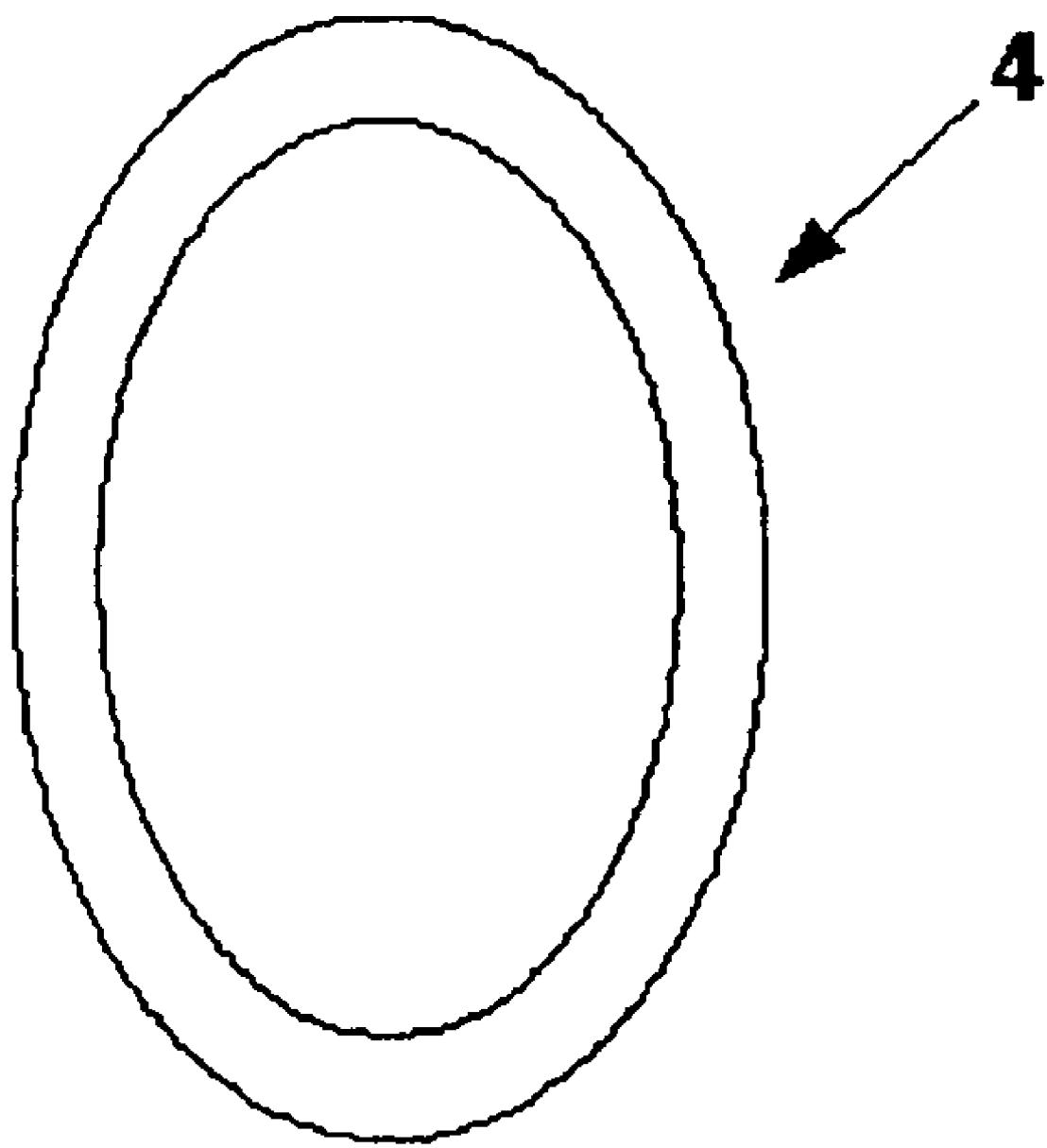
FIG. 10 is a schematic view of the direction key in another shape of the present invention.

In addition, the direction key 4 of the present embodiment is designed to have the shape of rectangle, because the direction key 4 in rectangle has four obvious edges in the front, rear, right and left sides compared with that in circle, resulting in that a user can distinguish more easily the respective operating portions (front portion 4f/back portion 4b, upper portion 4u/lower portion 4d and center portion 4c) of the direction key 4 in rectangle, that is, in the case of not taking care of the directionality of the electronic apparatus when being carried, a user can distinguish the respective operating portions (front portion 4f/back portion 4b, upper portion 4u/lower portion 4d and center portion 4c) by means of the tactile sense of his/her fingers. Of course, the direction key 4 can have the shape of oval (as shown in FIG. 10) or other shapes the respective operating portions of which can be distinguished by means of the tactile sense of the fingers. Thus, it can be used more intuitively and conveniently.

Figure 5:
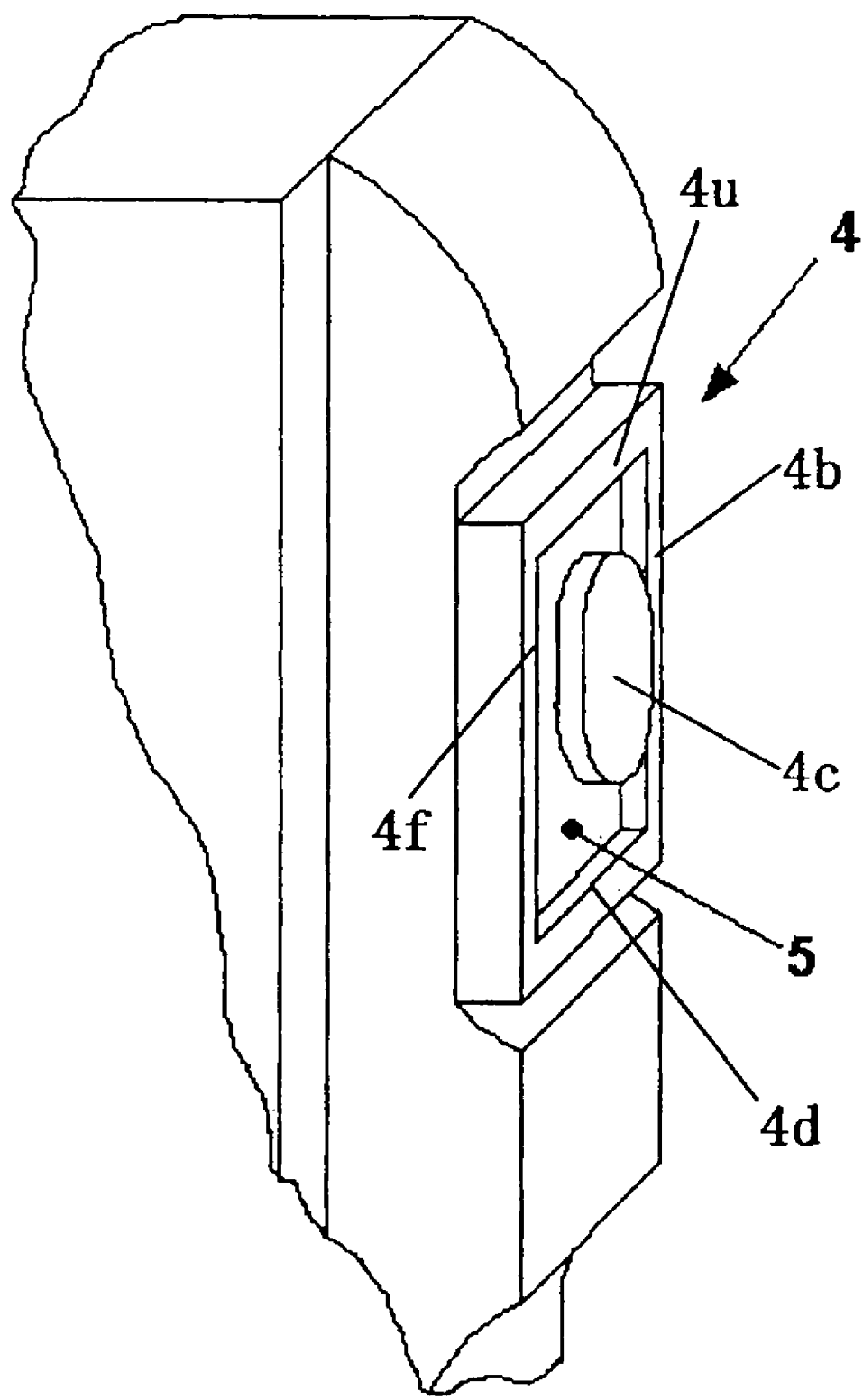
FIG. 5 is a partially enlarged schematic view of the electronic apparatus in FIG. 1.

In addition, as shown in FIG. 5, concavity 5 is provided on the outer surface of said direction key 4, which separates the center portion 4c of the direction key 4 from other operating portions thereof (front portion 4f/back portion 4b, upper portion 4u/lower portion 4d), facilitating easier operation of the direction key.

Figure 6:
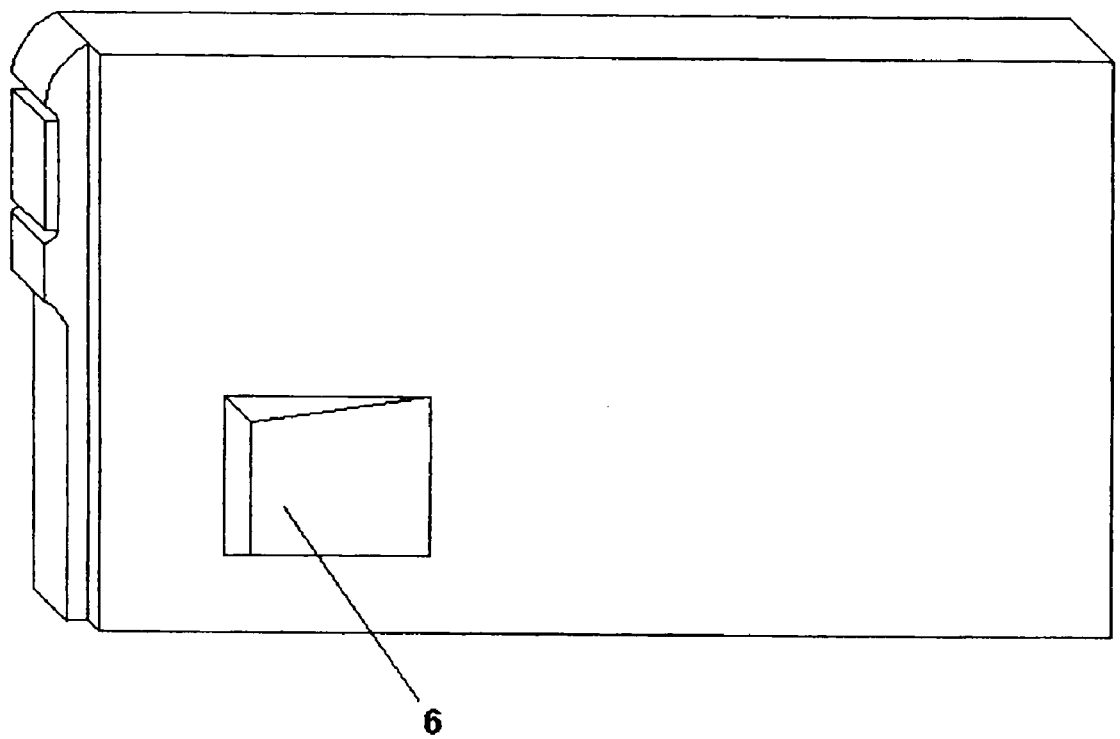
FIG. 6 is a rear perspective schematic view of the electronic apparatus in FIG. 1.

In addition, as shown in FIG. 6, concavity 6 for holding is provided in the lower portion of the rear side (back) of the electronic apparatus near the side where direction key 4 is positioned. When a user holds the electronic apparatus, his/her finger can be put into the concavity 6 to prevent slip, facilitating more stable hold of the electronic apparatus and more convenient operation of the direction key by user.

The Second Embodiment

Figure 7A:
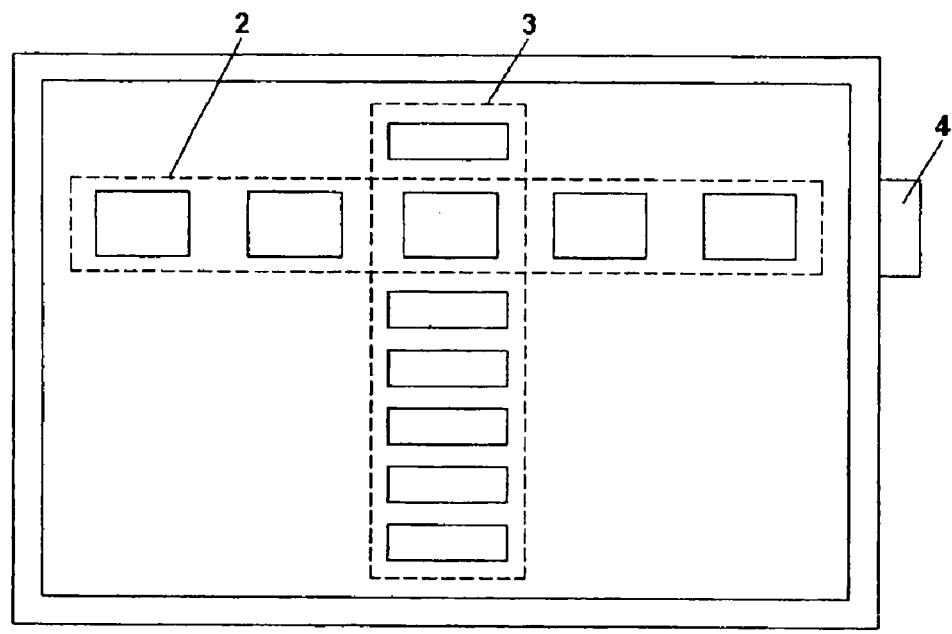
FIG. 7 is a schematic view of the electronic apparatus of the second embodiment of the present invention.
Figure 7B:
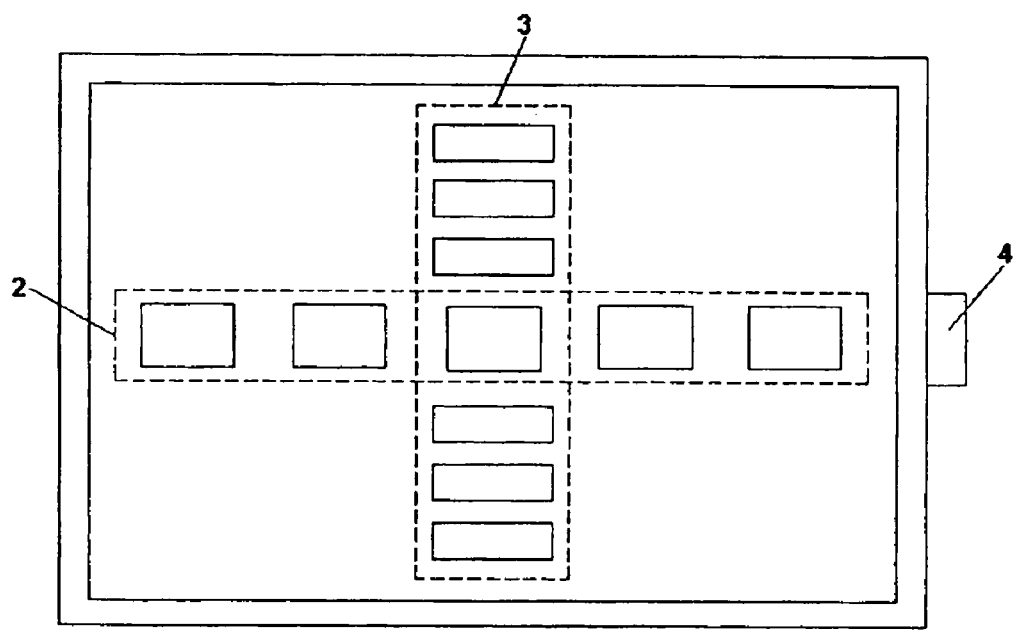

FIGS. 7a, 7b show the second embodiment of the present invention. The second embodiment is the same substantially as the first embodiment except that main menu display area 2 and submenu display area 3 cross over each other with the upper portion of submenu display area 3 being above main menu display area 2 and the lower portion of submenu display area 3 being below main menu display area 2. In the electronic apparatus of the second embodiment as shown in FIG. 7b, direction key 4 is provided in the center portion rather than the upper portion of said side.

The Third Embodiment

Figure 8:
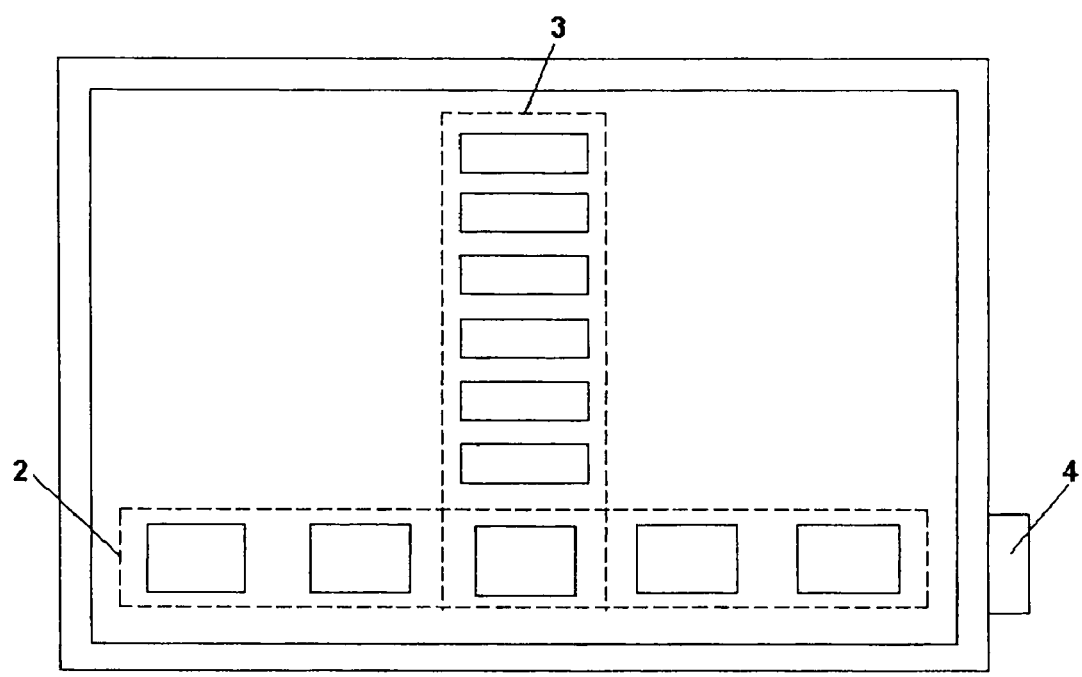
FIG. 8 is a schematic view of the electronic apparatus of the third embodiment of the present invention.

FIG. 8 shows the third embodiment of the present invention. The third embodiment is the same substantially as the first embodiment except that main menu display area 2 is positioned in the lower portion of the display screen and submenu display area 3 is positioned above main menu display area 2. In the electronic apparatus of the third embodiment as shown in FIG. 8, direction key 4 is provided in the lower portion rather than the upper portion of said side.

The Fourth Embodiment

Figure 9:
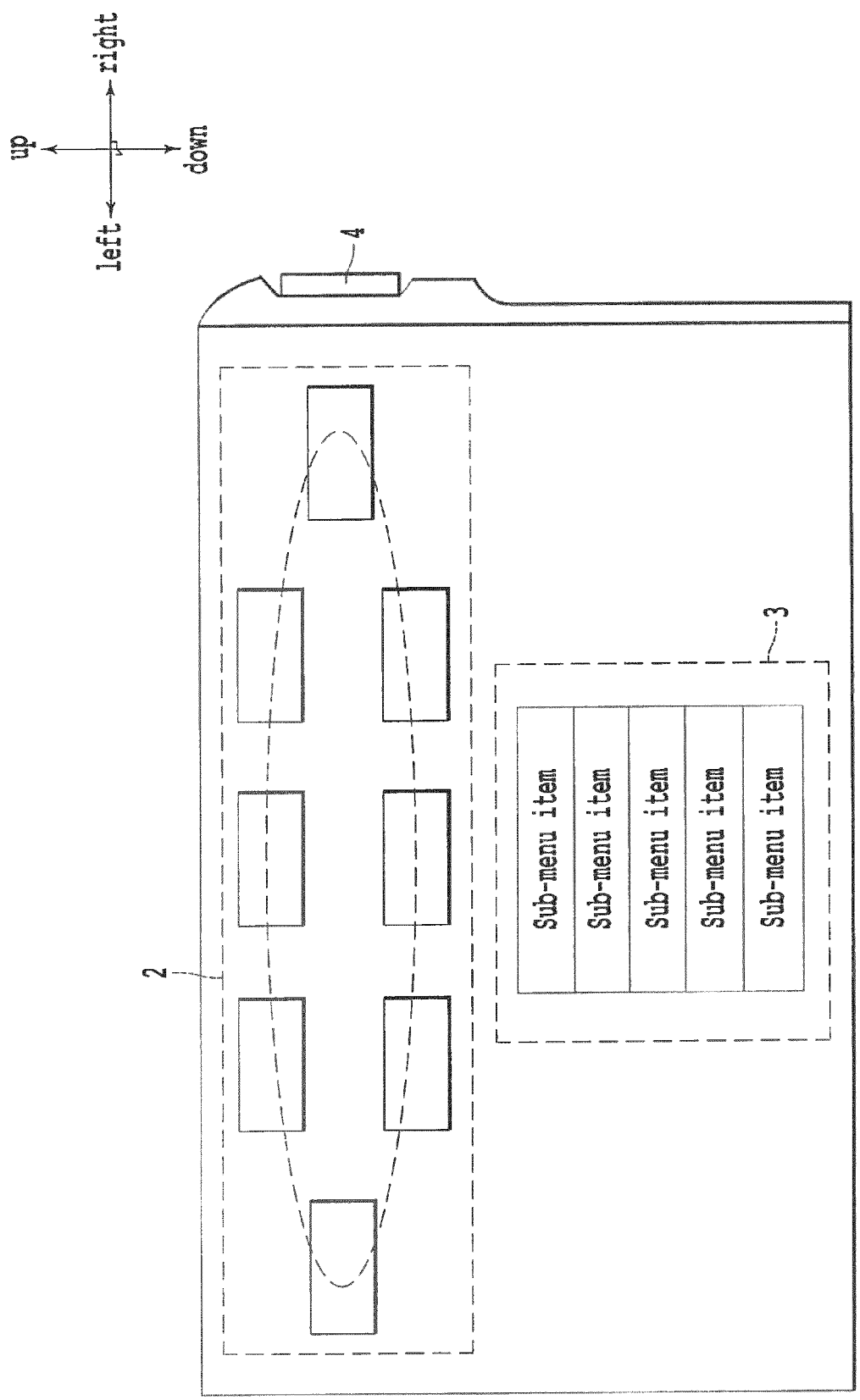
FIG. 9 is a schematic view of the electronic apparatus of the fourth embodiment of the present invention.

FIG. 9 shows the fourth embodiment of the present invention. The fourth embodiment is the same substantially as the first embodiment except that a plurality of main menu items in main menu display area 2 are arranged in a loop along the right-left direction.

Description on Embodiments of Other Possible Variations

The electronic apparatuses with display screen of the first to fourth embodiments may be a mobile phone, a portable audio player, portable video player, PMP (Portable Media Player), PDA (Personal Digital Assistance), digital camera or pickup camera, of course, it may be other electronic apparatuses with display screen such as a display device, portable TV and the like.

Although the foregoing gives the detailed descriptions of the preferred embodiments of the present invention, it will be apparent to those skilled in the art that various variations and modifications can be made within the scope of the present invention. In a word, the scope of protection of the present invention is defined by the appendant claims.

What is claimed is:

1. An electronic apparatus comprising:
   a display screen provided on a front surface of the electronic apparatus having a first menu display area and a second menu display area; and
   a direction key provided on a side surface of said electronic apparatus,
   wherein a plurality of first menu items arranged in a right-left direction are displayed in said first menu display area, and a plurality of second menu items arranged in an up-down direction are displayed in said second menu display area, said direction key and said first menu display area are positioned on a same straight line extending in the right-left direction, the first menu items in the first menu display area being selectable when a front portion/back portion of the direction key is pressed, and the second menu items corresponding to the selected first menu items being selectable in the second menu display area when an upper portion/lower portion of the direction key is pressed.

2. The electronic apparatus according to claim 1, wherein said direction key is depressible and a selected menu item is confirmed when a center portion of the direction key is depressed.

3. The electronic apparatus according to claim 1, wherein said display screen is composed of a touch panel.

4. The electronic apparatus according to claim 1, wherein said first menu display area is positioned entirely in an upper portion of the display screen and all of said second menu display area is positioned below said first menu display area throughout an operation of the direction key.

5. The electronic apparatus according to claim 1, wherein said first menu display area and said second menu display area cross over each other with the upper portion of said second menu display area being above said first menu display area and the lower portion of said second menu display area being below said first menu display area.

6. The electronic apparatus according to claim 2, wherein said direction key has a shape of one of a rectangle and an oval.

7. The electronic apparatus according to claim 1, wherein the plurality of first menu items in said first menu display area are arranged in a row along the right-left direction.

8. The electronic apparatus according to claim 1, wherein the plurality of first menu items in said first menu display area are arranged in a loop form along the right-left direction.

9. The electronic apparatus according to claim 1 or 2, wherein a concavity is provided on the outer surface of said direction key.

10. The electronic apparatus according to claim 1 or 2, wherein a rectangular concavity for holding the electronic apparatus is provided in a lower portion of a rear side of said electronic apparatus near the side where the direction key is positioned.

11. The electronic apparatus according to claim 1, wherein the second menu display area is positioned entirely in an upper portion of the display screen and all of the first menu display area is positioned below the second menu display area throughout an operation of the direction key.

12. The electronic apparatus according to claim 1, wherein the direction key and the first menu display area are positioned substantially on the same straight line extending in the right-left direction throughout an operation of the direction key.

13. The electronic apparatus according to claim 1, wherein the direction key is provided on the side surface of the electronic apparatus without additional keys being arranged on the side surface.

* * * * *

UNITED STATES PATENT AND TRADEMARK OFFICE
CERTIFICATE OF CORRECTION

| | | |
|---|---|---|
| PATENT NO. | : 8,120,580 B2 | Page 1 of 1 |
| APPLICATION NO. | : 12/104786 | |
| DATED | : February 21, 2012 | |
| INVENTOR(S) | : Yasufumi Yamaji et al. | |

It is certified that error appears in the above-identified patent and that said Letters Patent is hereby corrected as shown below:

On the title page, Item (30), the Foreign Application Priority Data is omitted. Item (30) should read:

-- (30)        Foreign Application Priority Data

Apr. 17, 2007   (CN) ................................. 2007-10101324.4 --

Signed and Sealed this
Seventeenth Day of April, 2012

David J. Kappos
*Director of the United States Patent and Trademark Office*